(12) United States Patent
Sams et al.

(10) Patent No.: US 8,414,756 B2
(45) Date of Patent: Apr. 9, 2013

(54) REMOVAL OF GLYCERIN FROM BIODIESEL USING AN ELECTROSTATIC PROCESS

(75) Inventors: Gary W. Sams, Tulsa, OK (US); William A. Summers, Des Moines, IA (US); Sarabjit S. Randhava, Evanston, IL (US); Harry G. Wallace, Tulsa, OK (US)

(73) Assignee: National Tank Company, Houston, TX (US)

( * ) Notice: Subject to any disclaimer, the term of this patent is extended or adjusted under 35 U.S.C. 154(b) by 636 days.

(21) Appl. No.: 12/261,208

(22) Filed: Oct. 30, 2008

(65) Prior Publication Data
US 2010/0108523 A1 May 6, 2010

(51) Int. Cl.
*B03C 5/02* (2006.01)
*C02F 1/46* (2006.01)
*C02F 1/48* (2006.01)

(52) U.S. Cl.
USPC .................. 204/673; 204/660; 210/748.01

(58) Field of Classification Search ........... 210/748, 210/748.01, 243; 204/660–674
See application file for complete search history.

(56) References Cited

U.S. PATENT DOCUMENTS

| | | | |
|---|---|---|---|
| 1,838,920 A * | 12/1931 | Eddy | 204/669 |
| 3,073,775 A * | 1/1963 | Waterman | 204/671 |
| 3,205,161 A | 9/1965 | Turner | |
| 3,715,402 A | 2/1973 | Louvar | |
| 4,274,106 A | 6/1981 | Ohdate | |
| 4,308,127 A * | 12/1981 | Prestridge et al. | 204/666 |
| 4,372,837 A * | 2/1983 | Watson et al. | 204/562 |
| 4,407,706 A | 10/1983 | Merchant et al. | |
| 4,804,453 A | 2/1989 | Sublette et al. | |
| 5,147,045 A | 9/1992 | Chi et al. | |
| 6,010,634 A * | 1/2000 | Sams et al. | 210/801 |
| 6,136,174 A | 10/2000 | Berry et al. | |
| 6,391,268 B1 | 5/2002 | Berry et al. | |
| 6,860,979 B2 | 3/2005 | Sams | |

OTHER PUBLICATIONS

Graham Laming, "Printout From Website Entitled Electrostatic Separation of Glycerol From Biodiesel," www.graham-laming.com, (Sep. 9, 2006).
International Search Report and Written Opinion of the International Searching Authority (ISA/US) issued by the International Searching Authority on Dec. 4, 2009; 10pgs.

* cited by examiner

*Primary Examiner* — Nicholas A Smith
*Assistant Examiner* — Brian W Cohen
(74) *Attorney, Agent, or Firm* — Gable & Gotwals (57) ABSTRACT

A vertical electrostatic coalescer comprises a first and second electrode surface and a horizontally disposed foraminous surface. The first electrode surface and horizontally disposed foraminous surface are at ground potential. The first and second electrode surfaces share the same planar orientation relative to the central longitudinal axis of the vessel. The unique arrangement of the vessel and opposing pairs of first and second electrode surfaces provides for a substantially uniform voltage field around a perimeter of the vessel and an effective voltage field for coalescence within a center of the vessel. A circular-shaped distributor pipe or a distributor housing serves to absorb momentum of the incoming emulsion stream and distribute the stream into an interior of the vessel.

17 Claims, 9 Drawing Sheets

REMOVAL OF GLYCERIN FROM BIODIESEL USING AN ELECTROSTATIC PROCESS

REFERENCE TO PENDING APPLICATIONS

This application is not based upon any pending domestic or international patent applications.

FIELD OF INVENTION

This invention relates generally to electrostatic coalescers, and, more particularly, to an improved vertical coalescer to promote separation of glycerin from biodiesel.

BACKGROUND OF THE INVENTION

Conventional biodiesel production employs homogeneous alkaline catalysts to transform seed oils or animal fats into fatty acid alkyl esters and glycerin. The normal volume ratio of alkyl esters to glycerin is 10:1. Separating the glycerin from the ester layers by capitalizing on their different specific gravities—1.26 kg/L for glycerin and 0.86-0.90 kg/L for esters—is common but cost inefficient.

Large quantities of water are required to remove glycerin and spent catalyst from the ester layer, which tends to reduce the market value of the glycerin byproduct. Static or centrifugal separators are difficult to manage and tedious to operate, lending considerable risk to the quality of the final alkyl ester product, which must meet ASTM specifications (D6751-07b) before any use in on-road vehicles as biodiesel.

Newer continuous processes for biodiesel production using heterogeneous catalysts enable the transeterification reaction to proceed continuously. Such continuous processing requires the application of cost effective, time efficient, and complete separation of glycerin from the alkyl ester stream. Because no water is used in these newer solid catalytic processes, the quality of the glycerin is higher (about 98%) and its market value considerably greater than glycerin from homogeneous catalytic processes. The lower volume glycerin streams, which typically range from less than 400 barrels per day to as much as 1,000 barrels per day, require a continuous, rapid separation for their economy.

Recent tests conducted by the inventors have shown that glycerin can be readily and rapidly coalesced by an electrostatic field and the separation rate is increased by the development of large glycerin droplets. Although electrostatic coalescence is a proven, effective method for crude oil dehydration, electrostatic coalescers are not well-suited for biodiesel production. These crude oil coalescers are typically large, horizontally oriented vessels. A need exists, therefore, for smaller, vertically oriented, electrostatic coalescers to promote the separation of glycerin from alkyl fatty acid esters in the continuous production of biodiesel.

BRIEF SUMMARY OF THE INVENTION

An electrostatic coalescer for promoting glycerin coalescence in biodiesel e comprises an vertically disposed vessel having a fluid inlet located at a lower portion, a first fluid outlet located at a bottom, and a second fluid outlet located at a top of the vessel. In a preferred embodiment, two or more vertically disposed first and second electrode surfaces are located in an upper portion of the vessel. The electrodes radially extend outward from and about a central longitudinal axis of the vessel. The vessel is at ground potential and a portion of one or more of the first electrode surfaces is in communication with an interior surface of the vessel. A portion of one or more of the second electrodes is in communication with a power supply. Various types of power supply and electric circuitry may be employed to create effective electric fields for coalescence of the glycerin droplets contained in the emulsion.

Each first electrode surface lies adjacent to a second electrode surface, and each adjacent first and second electrode surfaces have substantially equal angular spacing therebetween. The first electrode surface preferably has a substantially uniform cross sectional area. The second electrode surface preferably has a teardrop-shaped cross sectional area. The unique arrangement of the vessel and opposing pairs of first and second electrode surfaces provides for a substantially uniform AC voltage field around a perimeter of the vessel and an effective DC field for coalescence within a center of the vessel. A field in the range of 2 kV/inch to 8 kV/inch is preferable for coalescing the glycerin.

The electrostatic coalescer further comprises a circular-shaped distributor pipe or a distributor housing that serves to absorb momentum of the incoming emulsion stream. An array of ports located about a periphery of the distributor pipe—or an array of ports located on an upper surface of the housing—substantially evenly distributes the stream into an interior of the vessel. As the glycerin-in-biodiesel stream enters the electric field established by the electrode surfaces, glycerin droplets coalesce. Once the droplets reach a size that overcomes gravity, the droplets fall to a glycerin phase located at a lower portion of the vessel. A level control monitors the glycerin phase and controls an outlet valve.

In another preferred embodiment, the electrostatic coalescer comprises one or more horizontally disposed first electrode surfaces located in an upper portion of the vessel. The electrode surface may be a circular shaped bar grate. A portion of the electrode surface is in communication with an inner surface of the vessel, which is at ground potential. Two or more horizontally disposed second electrode surfaces are oriented substantially parallel to the first electrode surface and are located a substantially equal distance above and below the first electrode surface, respectively. A passageway through the first electrode surface allows for a connector to connect the two second electrode surfaces to one another without communicating with the first electrode surface. The second electrode surface may comprise two or more rods of varying length, each rod oriented parallel to the other with each end of the rods lying a substantially equal distance from an opposing inner surface of the vessel. A power supply external to the vessel is in communication with one of the second electrode surfaces.

A better understanding of the invention will be obtained from the following description of the preferred embodiments and the claims, taken in conjunction with the attached drawings.

DETAILED DESCRIPTION OF THE PREFERRED EMBODIMENTS

Figure 1:
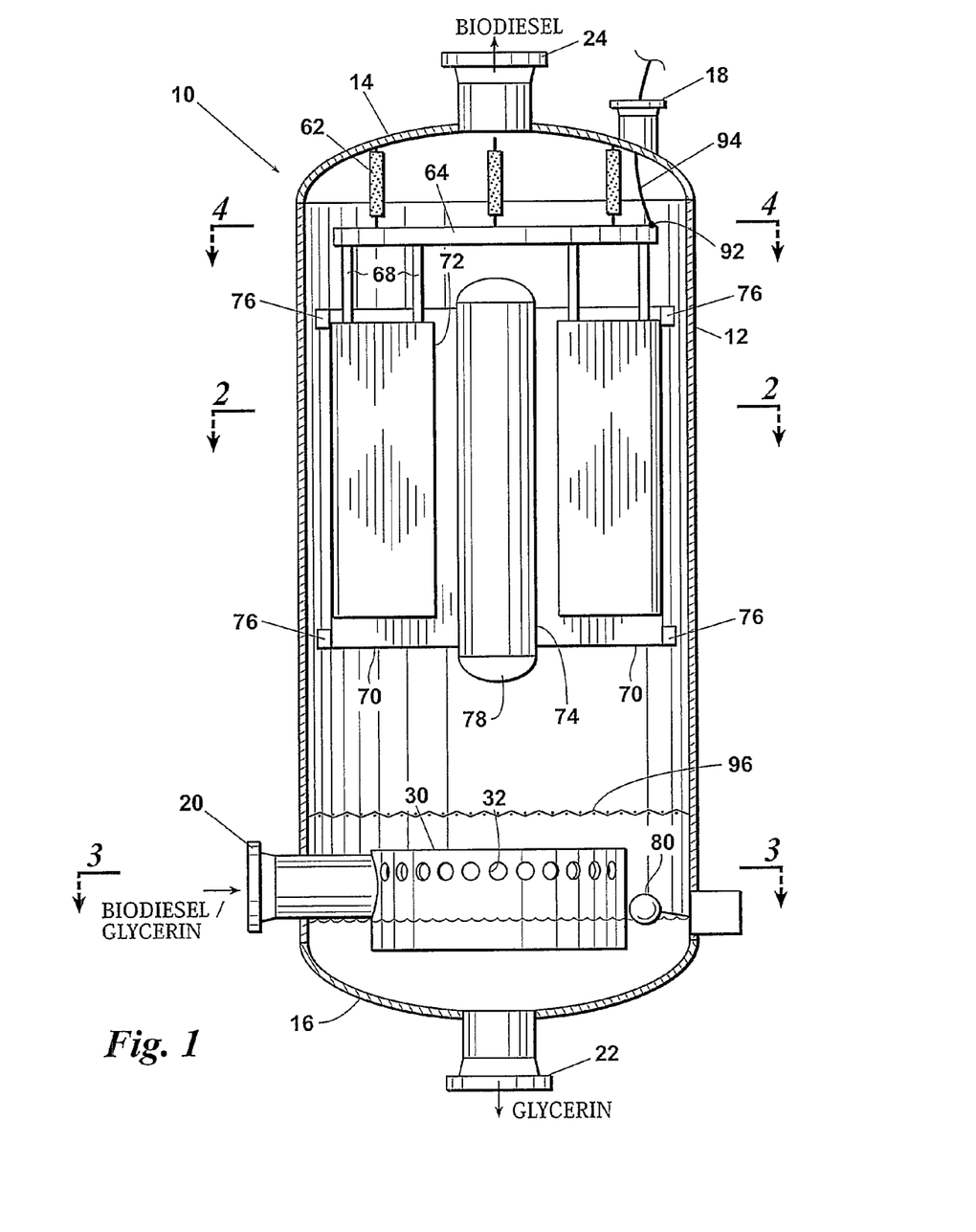
FIG. 1 is a cross-sectional view of a vertical electrostatic coalescer having a circular conduit for distributing an inlet stream of biodiesel and glycerin and employing an electric field to coalesce the glycerin droplets in the biodiesel. The electric field comprises circumferentially arranged and vertically disposed electrode surfaces.

An electrostatic coalescer as described below is not limited in its application to the details illustrated in the accompanying drawings. The coalescer is capable of other embodiments and of being practiced or carried out in a variety of ways. The phraseology and terminology employed herein, therefore, are for purposes of description and not limitation. Elements illustrated in the drawings are identified by the following numbers:

10 Electrostatic coalescer
12 Vessel
14 Vessel top
16 Vessel bottom
18 Contact rod
20 Emulsion inlet
22 Glycerin outlet
24 Biodiesel outlet
26 Support leg
28 Baffle
30 Distributor conduit
32 Port
34 Distributor housing
36 Port
38 Pipe with tee outlet
40 Brace
42 Electrode
44 Fastener
46 Insulated connector
48 Support
50 Electrode
52 Rod
54 Fastener
56 Passageway
58 Brace
60 Insulated hanger
62 Insulated hanger
64 Ring
66 Ring
68 Spoke
70 Electrode
72 Electrode
74 Centralizer
76 Tab
78 Cap
80 Float assembly
88 Baffle
90 Power source
92 High voltage connection
94 Conductor
96 Foraminous plate
98 Electrode
100 Electrode
102 Hangar assembly Referring to FIG. 1, in a preferred embodiment an electrostatic coalescer 10 comprises a vertically oriented vessel 12 having an inlet 20, a heavy component (glycerin) outlet 22, and a lighter component (biodiesel) outlet 24. Positioned within vessel 12 is a first electrode surface 70 and a second electrode surface 72. Electrode 70 is in communication with vessel 12, which is at ground potential, via a set of tabs 76. Because glycerin is such a poor conductor, it is preferable to add a ground in the form of a foraminous plate 96, which is attached to vessel 12 and located in a lower portion of vessel 12. Plate 96 may also be a wire screen or bar grate. Electrode 72 is connected by a conductor 94 to a power source (not shown). Conductor 94 enters an interior of vessel 12 through a contract rod 80 located on an exterior surface of vessel 12. The power source is of a type well known in electrostatic coalescence and the electrical circuitry employed may incorporate multiple frequency wave forms. For more detailed information on power sources and related circuitry used in electrostatic coalescence, review U.S. Pat. No. 6,860,979, entitled "Dual Frequency Electrostatic Coalescence" and issued to Gary W. Sams on Aug. 7, 2002, and application Ser. No. 11/057,900, entitled "Multiple Frequency Electrostatic Coalescence," filed Feb. 15, 2005, by Gary W. Sams, both of which are hereby incorporated by reference.

Figure 2:
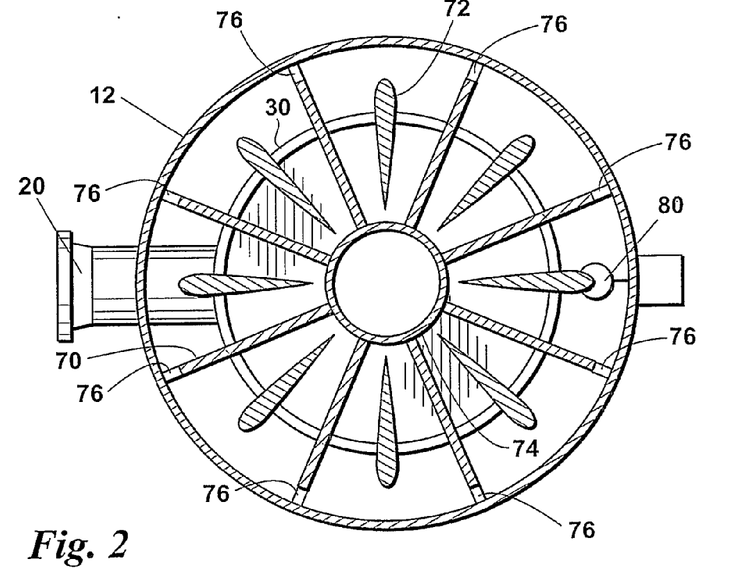
FIG. 2 is a view of the electrostatic coalescer taken along section line 2-2 of FIG. 1. Electrode surfaces having a charge alternate with and are substantially equally spaced between electrode surfaces at ground potential.
Figure 4:
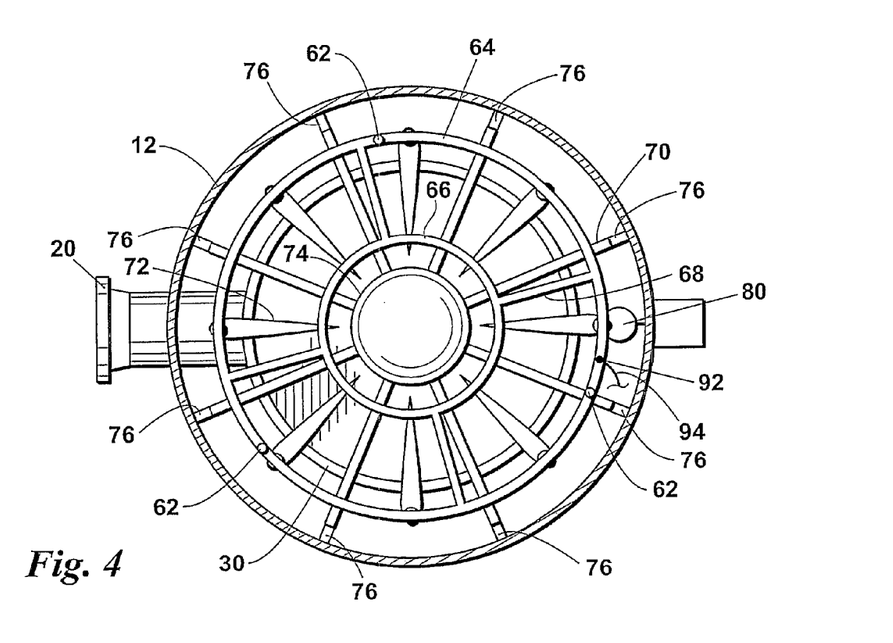
FIG. 4 is a view taken along section line 4-4 of FIG. 1. A set of concentric rings provides support and spacing for the circumferentially arranged fin-shaped electrode surfaces

Electrodes 70, 72 form an electric field within an interior of vessel 12. The electrodes 70, 72 are oriented so that the glycerin-in-biodiesel stream passes between and about adjacent pairs of electrodes 70, 72 and through the electric field. As illustrated in FIGS. 2 and 4, each electrode 72 preferably has a teardrop-shaped cross sectional area and is suspended vertically by a pair of rings 64, 66 that are oriented horizontally and arranged concentric to a central longitudinal axis of vessel 12. Electrode 70 preferably has a substantially uniform cross sectional area. The rings 64, 66, in turn, are suspended by three insulated hanger rods 62 which electrically insulate vessel 12 from a charge being applied to ring 64 at connection point 92. Four substantially equally spaced spokes 68 connect rings 64 and 66 to one another.

The electrodes 72 radially extend outward in relation to a central longitudinal axis of vessel 12 so that each electrode 72 relative to each adjacent electrode 70 preferably has substantially the same angular spacing therebetween. An inner lateral edge and an outer lateral surface of each electrode 72 lies a substantially equal distance from an opposing inner surface of vessel 12 and the central longitudinal axis of vessel 12, respectively. Through the above arrangement, electrodes 72 carry a charge but remain insulated from vessel 12 and electrode 70.

Each electrode 70 radially extend outward from a hollow cylindrical-body centralizer 74. The electrodes 70 are preferably arranged so that each electrode 70 relative to each adjacent electrode 72 has substantially the same angular spacing therebetween. Centralizer 74 is arranged concentric to the central longitudinal axis of vessel 12 and has a conical-shaped end cap 78 at each end. End cap 78 prevents emulsion from entering an interior of centralizer 74 and serves to reduce turbulence within vessel 12.

A portion of an outer lateral edge of electrode 70 connects to a tab 74 located on an inner surface of vessel 12. Adjacent pairs of electrode 70 form a space within which an electrode 72 is contained. Each electrode 72 has substantially equal angular spacing from each electrode 70. The relative spacing and shape of electrodes 70, 72 also work to control turbulence within vessel 12. Additionally, because an exterior surface of centralizer 74 is in contact with an inner lateral edge of electrode 70, centralizer 74 functions as an electrode. Similarly, an inner surface of vessel 12 functions as an electrode. The configuration and positioning of electrodes 70 and 72 relative to each other and to vessel 12 and centralizer 74 provides for a substantially uniform electric field preferably in a range of 2 to 8 kV per inch spacing between electrodes 70 and 72.

Figure 3:
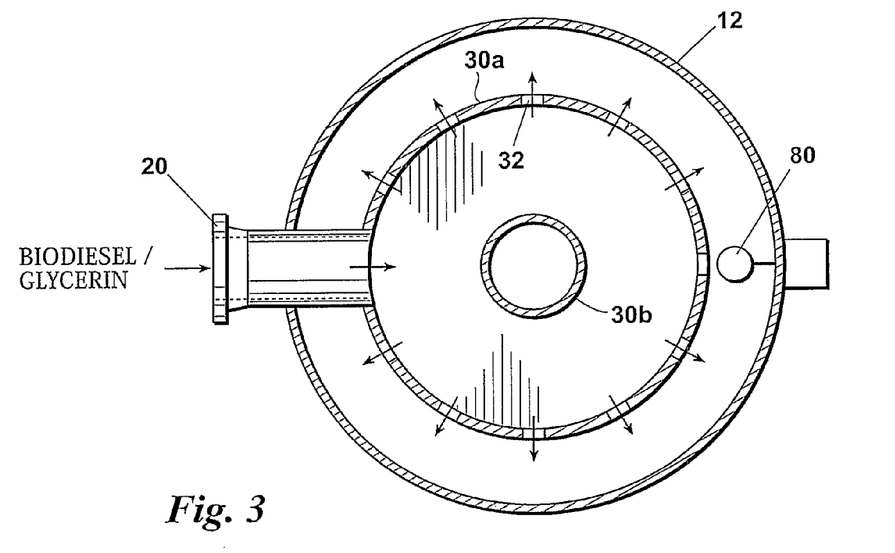
FIG. 3 is a view taken along section line 3-3 of FIG. 1. A circular conduit having an array of ports serves to absorb momentum of the inlet stream and substantially evenly distribute the stream into an interior of the coalescer.

Returning to FIG. 1, and also referring to FIG. 3, the glycerin-in-biodiesel stream flowing into inlet 20 is routed to a distributor conduit 30, preferably circular shaped. Conduit 30 has an array of substantially evenly spaced circular-shaped ports 32 located about its periphery 30a. Conduit 30 absorbs momentum of the incoming glycerin-in-biodiesel stream and reduces its velocity, thereby controlling turbulence within vessel 12 while distributing the stream substantially evenly within vessel 12. As the stream disperses into the interior of vessel 12 it migrates upwardly toward the electric field created by electrodes 70 and 72. As the emulsion travels through the electric field, a bulk of the dispersed glycerin coalesces.

As the coalesced droplets grow in size, gravity overcomes the electric field that suspends the droplets between the electrodes 70, 72, and the droplets fall to a glycerin phase collecting at a bottom 16 of vessel 12. A float assembly 80 monitors the level of glycerin being collected. Once the level of glycerin reaches a predetermined level, a valve (not shown) opens and allows the glycerin to exit vessel 12 through outlet 22.

Figure 5:
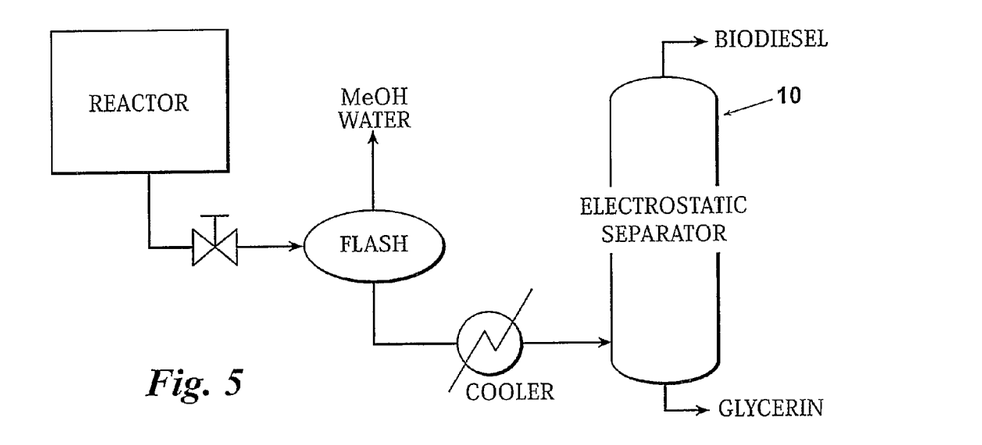
FIG. 5 is view of a typical operating environment for the electrostatic coalescer.

FIG. 5 illustrates a typical operating environment for the electrostatic coalescer 10. The transesterification reaction occurs upstream from the coalescer, whether by the conventional process involving the admixture of triglycerides, methanol and the homogeneous alkaline catalyst, or by the newer process employing a heterogeneous, acid catalyst in which triglycerides and methanol are admixed and then stirred with the solid catalyst or passed over a fixed bed containing the solid catalyst. Once the reaction is complete, the feed to the electrostatic separator in either case, containing biodiesel and glycerin, will have been cooled and stripped of residual methanol and water, as appropriate. This feed to the electrostatic coalescer 10 will consist of biodiesel and glycerin in an approximate ratio by volume of 10:1.

Figure 6:
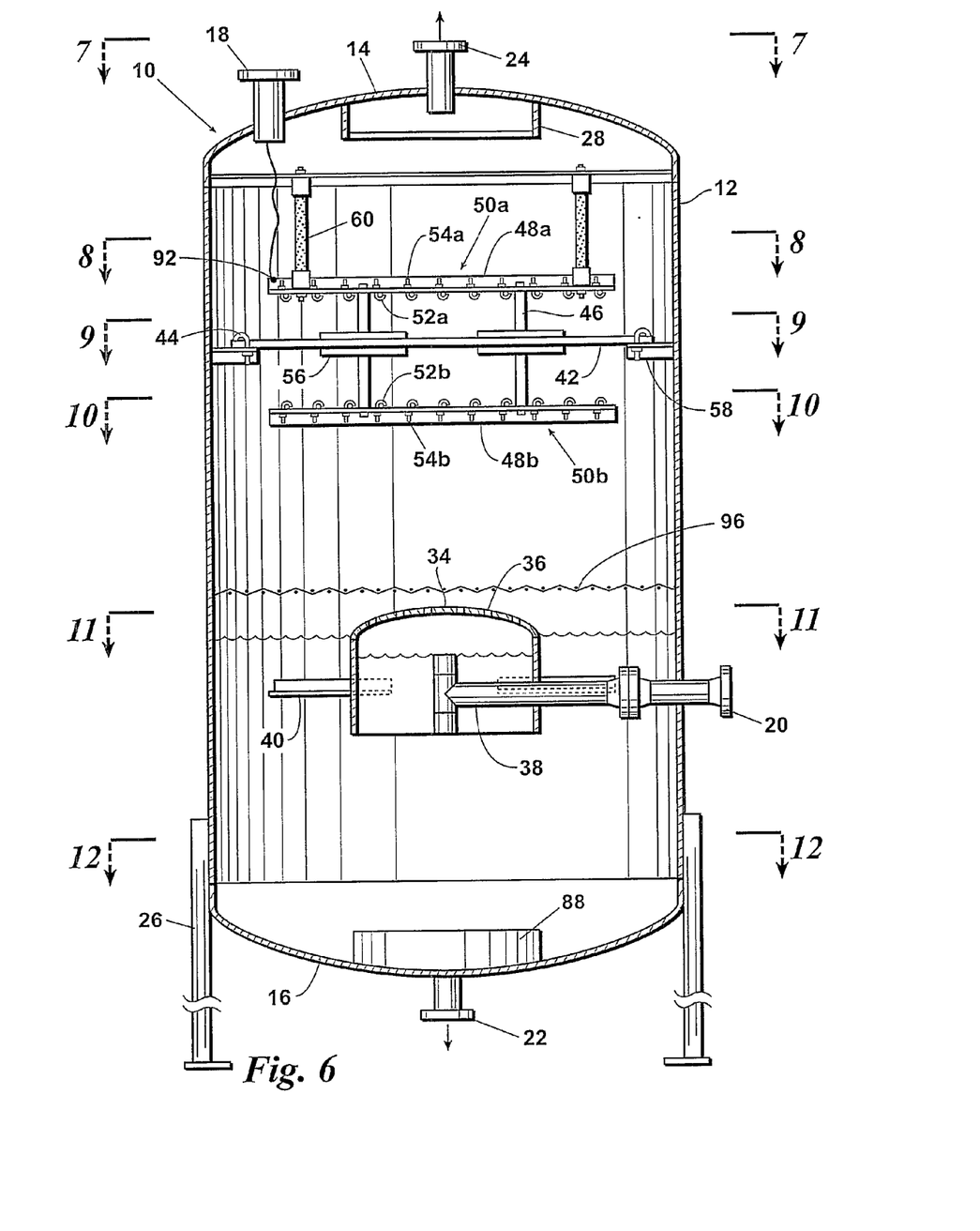
FIG. 6 is a cross-sectional view of another embodiment of the vertical electrostatic coalescer having a distributor housing and employing an electric field. The electric field comprises horizontally disposed electrode surfaces, one surface having the same charge as a power supply, the other surface being at ground potential.

Referring now to FIG. 6, another preferred embodiment of electrostatic coalescer 10 is illustrated. In this embodiment, electrodes 42 and 50 form an electric field. Electrode 42 is in communication with vessel 12, which is at ground potential, via a fastener 44 that attaches electrode 42 to an internal brace 58. Foraminous plate 96 is also at ground potential. Electrode 50 is connected to a power source (not shown) by a conductor 94 and is suspended by insulated hangers 62 that connect to an electrode supporting structure 46. The electrodes 42, 50 are each oriented in a horizontal plane, with a pair of electrodes 50a and 50b being positioned substantially parallel to and a substantially equal distance above and below electrode 42, respectively. An insulated connector 46 connects electrodes 50a and 50b.

Figure 8:
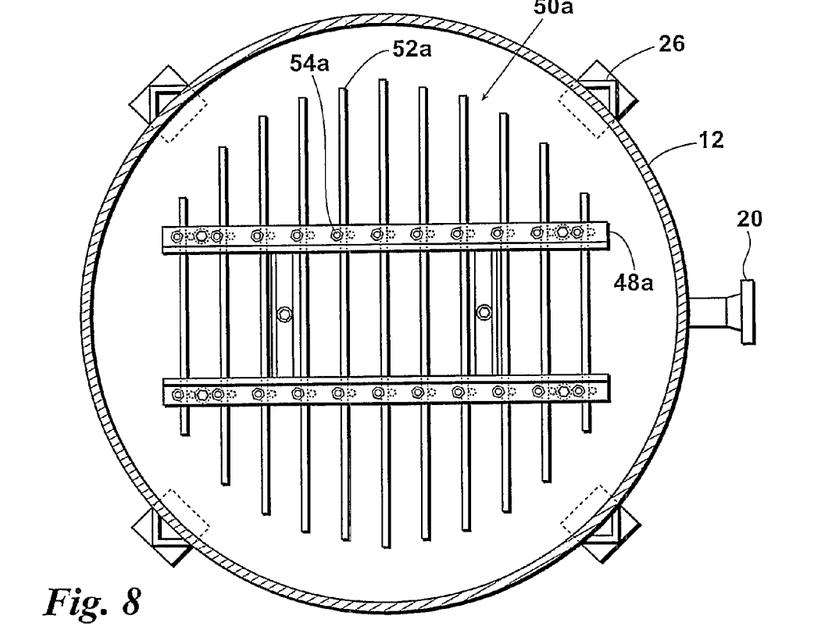
FIG. 8 is a view taken along section line 8-8 of FIG. 6. An electrode surface at charge comprises a plurality of different length rods, the rods being arranged in parallel with each rod end being a substantially equal distance from an opposing inner surface of the coalescer.
Figure 9:
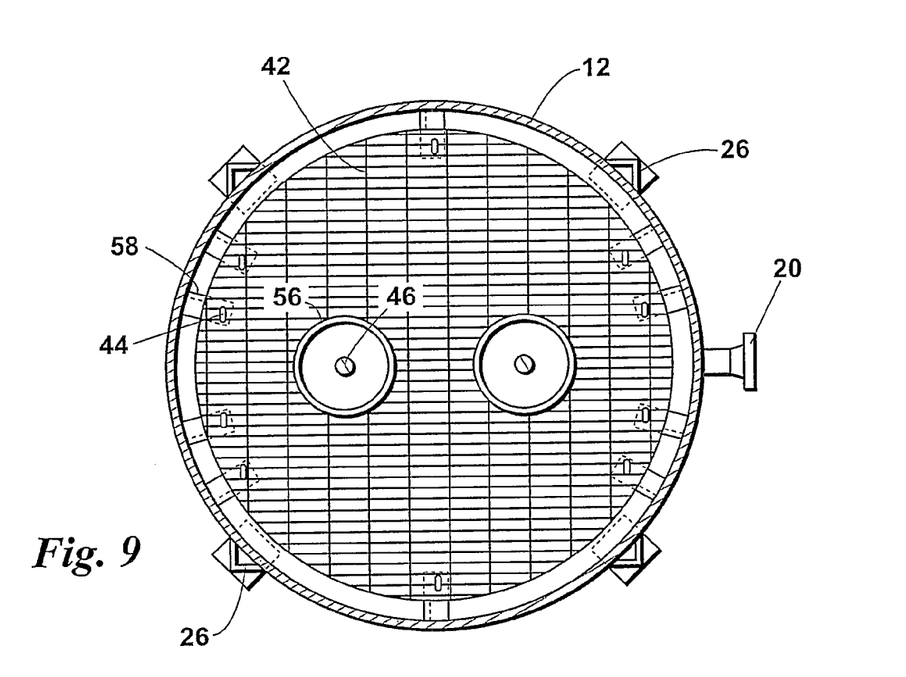
FIG. 9 is a view taken along section line 9-9 of FIG. 6. An electrode surface at ground potential comprises a circular bar grate having circular passageways therethrough.
Figure 10:
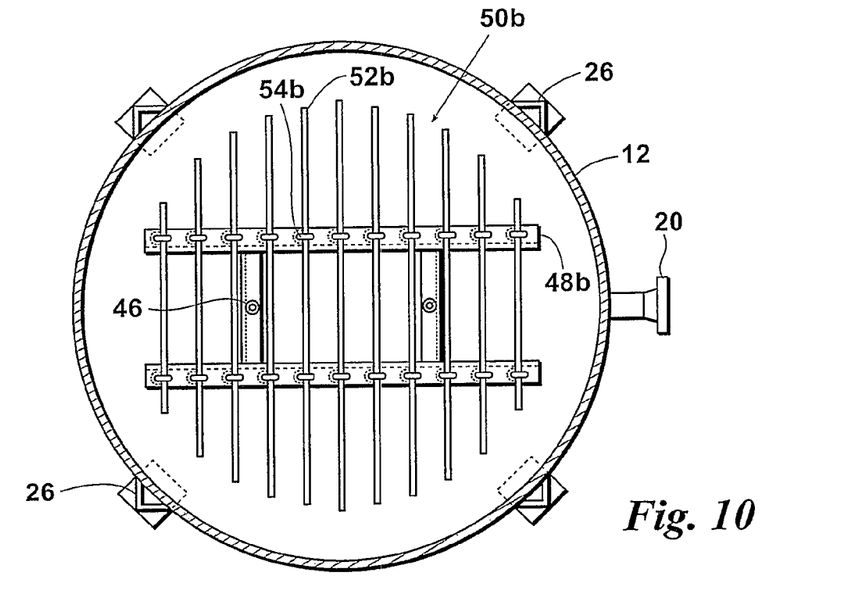
FIG. 10 is a view taken along section line 10-10 of FIG. 6.

As illustrated in FIGS. 8 and 10, electrode 50 preferably comprises a series of varying length rods 52a, 52b, each rod 52a, 52b being held by a pair of fasteners 54 and arranged so that adjacent rods 52a, 52b are parallel to one another and the end of each rod 52a, 52b lies a substantially equal distance from an opposing inner surface of vessel 12. As illustrated in FIG. 9, electrode 42 preferably comprises a circular-shaped bar grate being arranged concentric to vessel 12 and having two circular-shaped passageways 56 located on its interior surface. Insulated connector 50 passes through passageway 56, thereby isolating electrodes 42 and 50 from one another. The relative spacing and shapes of electrodes 42, 52 also work to control turbulence within vessel 12.

Figure 7:
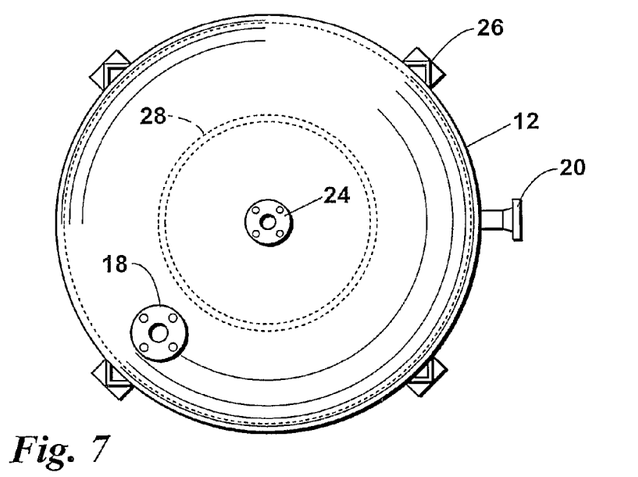
FIG. 7 is a view of the electrostatic coalescer taken along section line 7-7 of FIG. 6. An open, circular-shaped baffle helps to control turbulence and a flow of biodiesel to an outlet.
Figure 11:
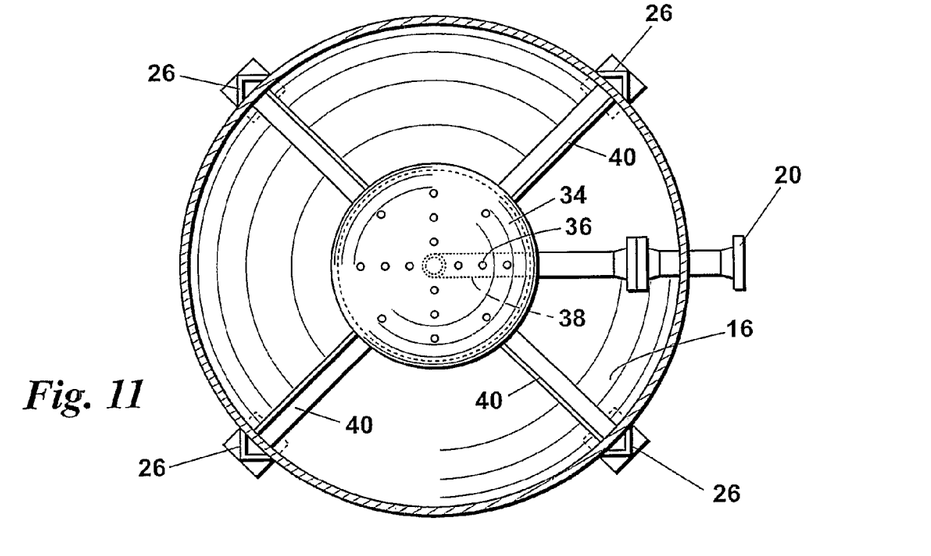
FIG. 11 is a view taken along section line 11-11 of FIG. 6. A distributor housing having an array of ports serves to absorb momentum of the inlet stream and substantially evenly distribute the stream into an interior of the coalescer.
Figure 12:
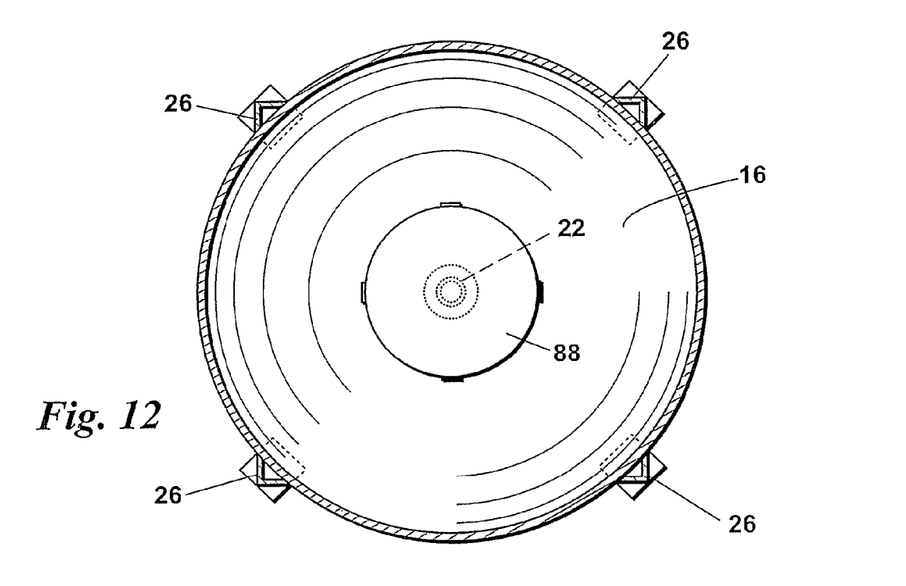
FIG. 12 is a view taken along section line 12-12 of FIG. 6. An open, cylindrical-shaped baffle helps to control turbulence and a flow of coalesced glycerin to an outlet.

Returning to FIG. 6, and also referring to FIGS. 7, 11, and 12, the glycerin-in-biodiesel stream flowing into inlet 20 is routed to pipe 38 having a tee at one end and being located within a distributor housing 34. One end of the tee of pipe 38 mates against a bottom surface of housing 34, the other end faces an array of substantially evenly spaced circular-shaped ports 36 located on an upper surface of housing 34. Housing 34 and pipe 38 absorb momentum of the incoming glycerin-in-biodiesel stream and reduce its velocity, thereby controlling turbulence within vessel 12 while distributing the stream substantially evenly within vessel 12.

As the stream disperses into the interior of vessel 12 it migrates upwardly toward the electric field created by electrodes 42 and 50. As the stream travels through electric field F, a bulk of the dispersed glycerin coalesces. As the coalesced droplets grow in size, gravity overcomes the electric field F that suspends the droplets between the electrodes 42 and 50 and the droplets fall to a glycerin phase collecting at a bottom 16 of vessel 12. A circular-shaped open-top baffle 48 serves to control a flow of glycerin to outlet 22. Similarly, a circular-shaped open-bottom baffle serves to control the flow of biodiesel to outlet 24.

Figure 13:
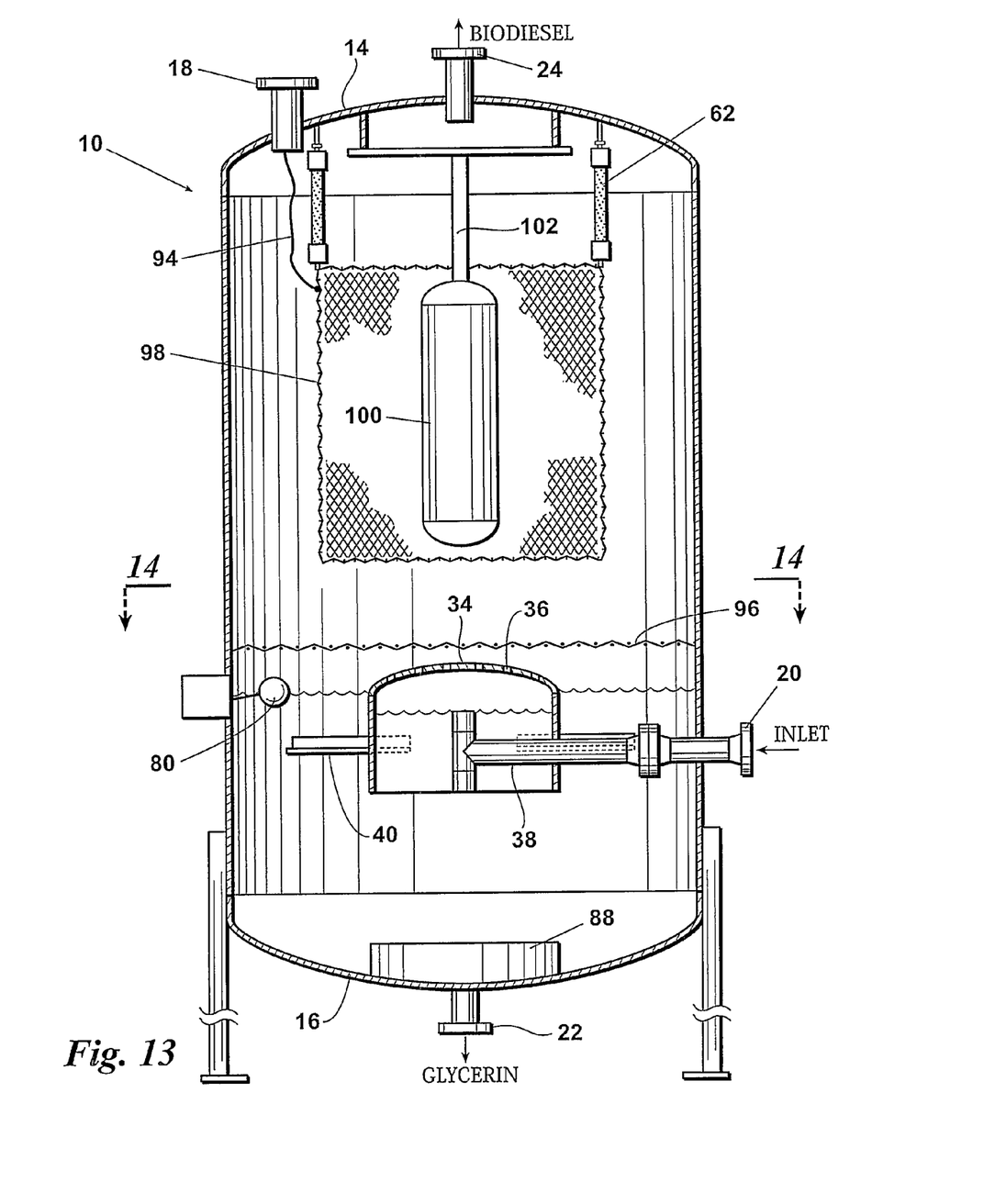
FIG. 13 is a cross-sectional view of another embodiment of the vertical electrostatic coalescer having a distributor housing and employing an electric field. The electric field includes a cylindrical wire screen having the same charge as a power supply and a centrally disposed, vertical closed cylinder being at ground potential.
Figure 14:
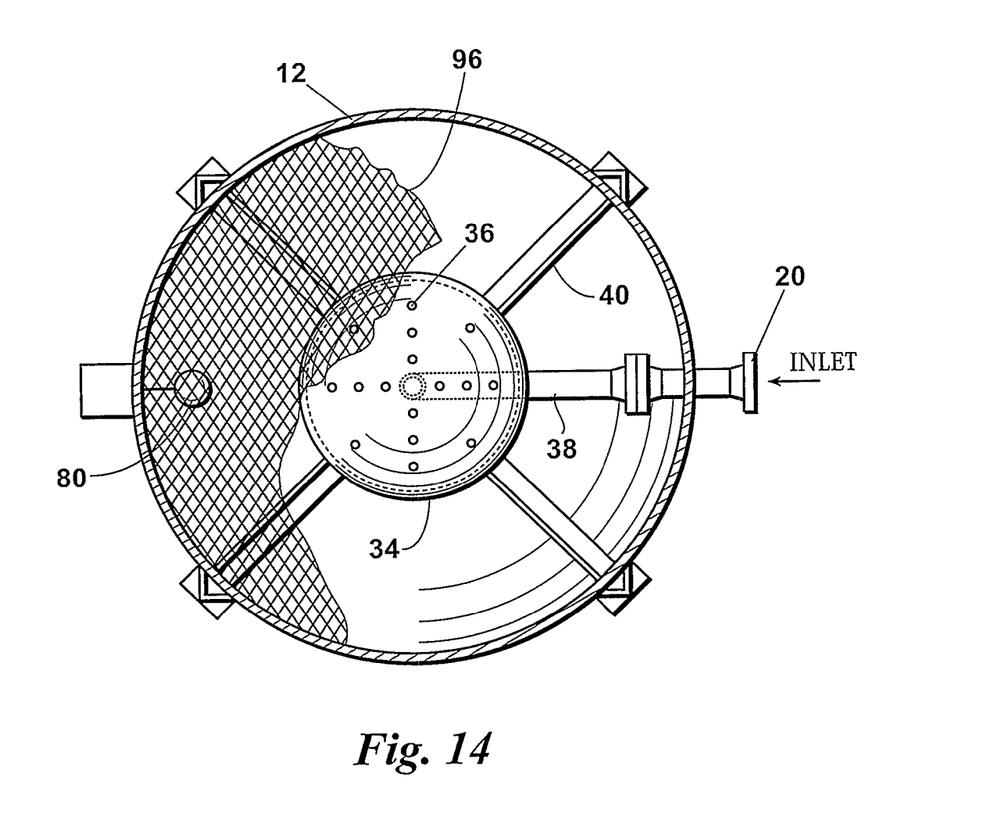
FIG. 14 is a view taken along section line 14-14 of FIG. 13.

FIGS. 13 and 14 illustrate another embodiment of electrostatic coalescer 10. In this embodiment, electrodes 98 and 100 form an electric field. Electrode 98 is a foraminous surface, preferably a cylindrical wire screen, connected to a power source (not shown) by conductor 94 and suspended by insulated hangers 62. Electrode 100 is a solid surface, preferably a hollow, closed end, cylinder in communication with vessel 12, which is at ground potential, via a hanger assembly 102. The electrodes 98, 100 are each oriented in a vertical plane. Foraminous plate 96 is at ground potential.

While electrostatic coalescer 10 has been described with a certain degree of particularity, many changes may be made in the details of construction and the arrangement of components without departing from the spirit and scope of this disclosure. The invention, therefore, is limited only by the scope of the attached claims, including the full range of equivalency to which each element thereof is entitled.

What is claimed is:

1. An electrostatic coalescer for promoting glycerin coalescence in a biodiesel stream, the electrostatic coalescer comprising:

an elongated, closed, vertically disposed vessel defining an interior volume and having a fluid inlet located at a lower portion of said vessel, a first fluid outlet located at a lower portion of said vessel, and a second fluid outlet located at a top portion of said vessel;

at least one first electrode surface located in an upper portion of said interior volume of said vessel and arranged about a central longitudinal axis of said vessel, a portion of said first electrode surface being in communication with an interior surface of said vessel, such communication grounding said first electrode surface;

at least one second electrode comprising a first surface of the second electrode and a second surface of the second electrode located in an upper portion of said interior volume of said vessel and arranged about the central longitudinal axis of said vessel and having a same planar orientation as said first electrode surface, said first and second electrode surfaces of the second electrode defining a horizontal cross section that becomes narrower toward the central longitudinal axis of said vessel;

a horizontally disposed foraminous surface located in a lower portion of said interior volume of said vessel above said fluid inlet and below said first and second electrode surfaces and grounded through being in communication with an interior surface of said vessel;

a power supply external to said vessel and being in communication with said second electrode surface;

whereby said first and second electrode surfaces and said foraminous surface establish effectively a voltage field around a perimeter portion of said interior volume of said vessel and in a center portion of said interior volume of said vessel, the voltage field serving to coalesce and augment the separation of glycerin in the biodiesel stream as the biodiesel stream passes between and about said first and second electrode surfaces and through said voltage field.

2. An electrostatic coalescer according to claim 1 wherein said first and second electrode surfaces are vertically disposed, radially extending electrode surfaces.

3. An electrostatic coalescer according to claim 2 wherein a portion of said first electrode surface comprises a different horizontal cross sectional area than a portion of said second electrode surface.

4. An electrostatic coalescer according to claim 1 wherein a portion of said first electrode surface comprises a solid surface and a portion of said second electrode surface comprises a foraminous surface.

5. An electrostatic coalescer according to claim 1 wherein a voltage between said first and second electrode surfaces is in a range of 2 kV/inch to 8 kV/inch.

6. An electrostatic coalescer according to claim 1 further comprising a circular-shaped distributor conduit, said distributor conduit being in communication with said fluid inlet and having an array of ports.

7. An electrostatic coalescer according to claim 1 further comprising a level control located in a lower portion of said vessel.

8. An electrostatic coalescer for promoting glycerin coalescence in a biodiesel stream, the electrostatic coalescer comprising:

an elongated, closed, vertically disposed vessel defining an interior volume and having a fluid inlet located at a lower portion of said vessel, a first fluid outlet located at a lower portion of said vessel, and a second fluid outlet located at a top portion of said vessel;

a plurality of vertically disposed, radially extending first electrode surfaces located in an upper portion of said interior volume of said vessel and arranged about a central longitudinal axis of said vessel, a portion of said first electrode surfaces being in communication with an interior surface of said vessel, such communication grounding first electrode surfaces;

a plurality of vertically disposed, radially extending second electrode surfaces located in an upper portion of said interior volume of said vessel and arranged about the central longitudinal axis of said vessel, said second electrode surfaces lying a substantially equal angular distance from adjacent pairs of said first electrode surfaces and being teardrop-shaped in horizontal cross-section;

a power supply external to said vessel and being in communication with said second electrode surfaces;

whereby said first and second electrode surfaces establish effectively a voltage field around a perimeter portion of said interior volume of said vessel and in a center portion of said interior volume of said vessel, the voltage field serving to coalesce and augment the separation of glycerin in the biodiesel stream as the biodiesel stream passes between and about said first and second electrode surfaces and through said voltage field.

9. An electrostatic coalescer according to claim 8 further comprising a horizontally disposed foraminous surface located in a lower portion of said interior volume of said vessel above said fluid inlet and below said first and second electrode surfaces and in communication with an interior surface of said vessel.

10. An electrostatic coalescer according to claim 8 further comprising a hollow closed end cylindrical body, said body being concentric to said vessel and in communication with said first electrode surfaces.

11. An electrostatic coalescer according to claim 8 further comprising a portion of said first electrode surfaces having a different horizontal cross sectional area than a portion said second electrode surfaces.

12. An electrostatic coalescer according to claim 11 further comprising a portion of said second electrode surfaces being curvilinear.

13. An electrostatic coalescer according to claim 8 wherein a voltage between each opposing pair of first and second electrode surfaces is in a range of 2 kV/inch to 8 kV/inch.

14. An electrostatic coalescer according to claim 8 further comprising a circular-shaped distributor conduit, said distributor conduit being in communication with said fluid inlet and having an array of ports.

15. An electrostatic coalescer according to claim 8 further comprising a level control located in a lower portion of said vessel.

16. An electrostatic coalescer according to claim 1 wherein said second electrode surfaces are part of a first set of second electrode surfaces, the first set of second electrode surfaces operating at a voltage level different than that of another set of second electrode surfaces.

17. An electrostatic coalescer according to claim 8 wherein said second electrode surfaces are part of a first set of second electrode surfaces, the first set of second electrode surfaces operating at a first voltage level at a voltage level different than that of another set of second electrode surfaces.

* * * * *